Dec. 18, 1962     C. H. DARBY     3,069,138
TIED ARCH JACKING FRAME

Filed Sept. 8, 1961     4 Sheets-Sheet 1

INVENTOR.
CLAUDE H. DARBY
BY
Adams, Forward and McLean
ATTORNEYS

Dec. 18, 1962 C. H. DARBY 3,069,138
TIED ARCH JACKING FRAME
Filed Sept. 8, 1961 4 Sheets-Sheet 2
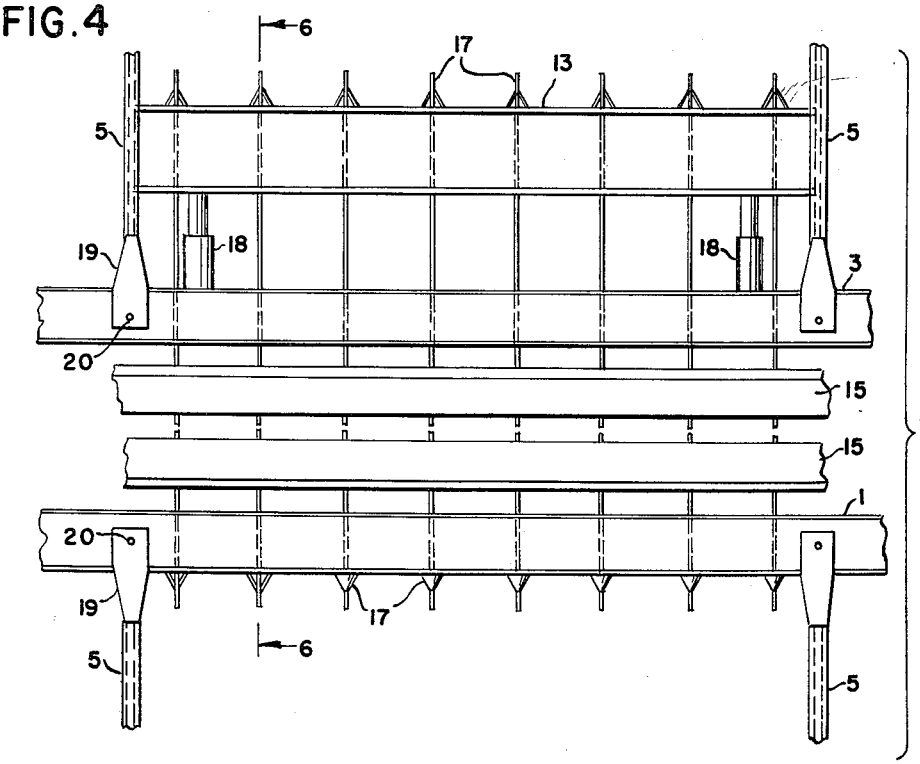
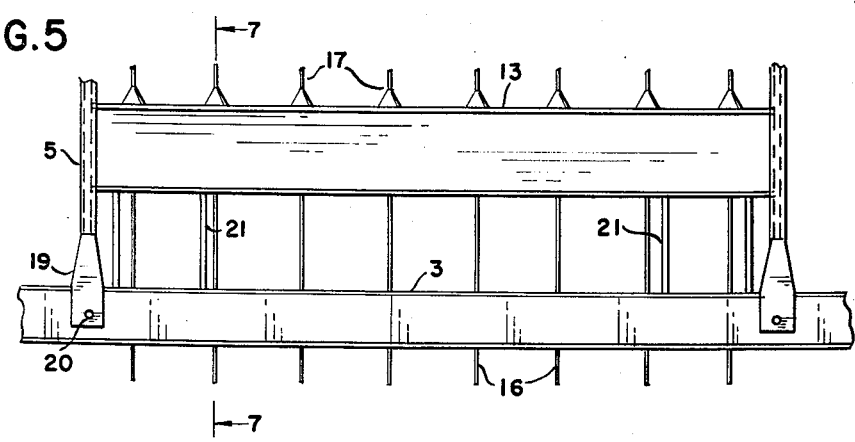
INVENTOR.
CLAUDE H. DARBY
BY
ATTORNEYS Dec. 18, 1962 C. H. DARBY 3,069,138
TIED ARCH JACKING FRAME
Filed Sept. 8, 1961 4 Sheets-Sheet 3
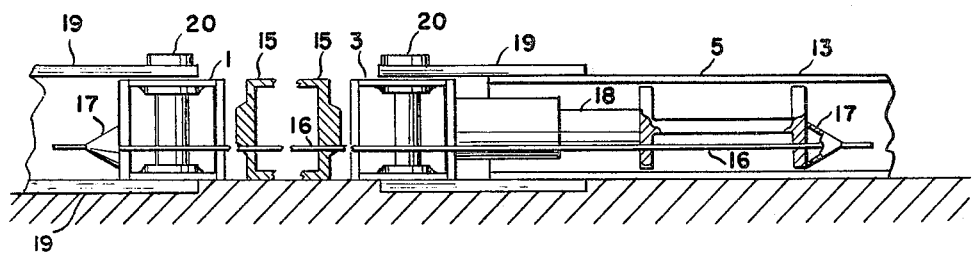
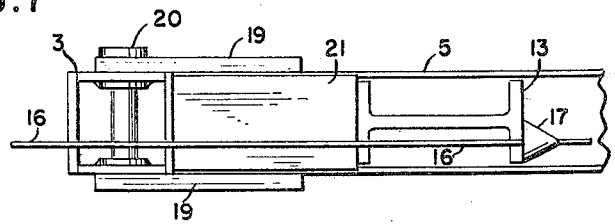
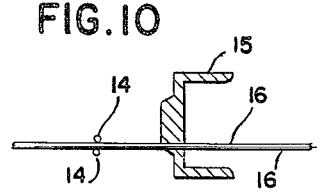
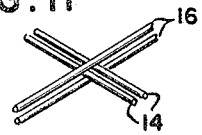
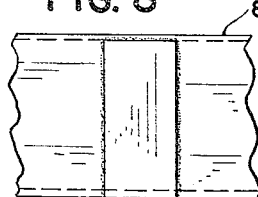
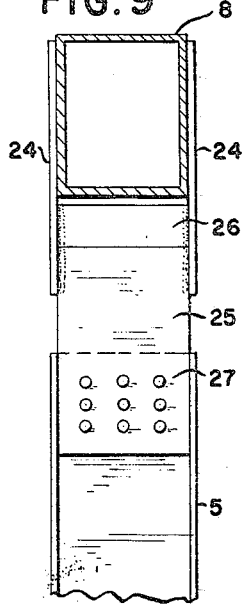
INVENTOR.
CLAUDE H. DARBY
BY
*Adams, Forward and McLean*
ATTORNEYS Dec. 18, 1962  C. H. DARBY  3,069,138
TIED ARCH JACKING FRAME
Filed Sept. 8, 1961  4 Sheets-Sheet 4
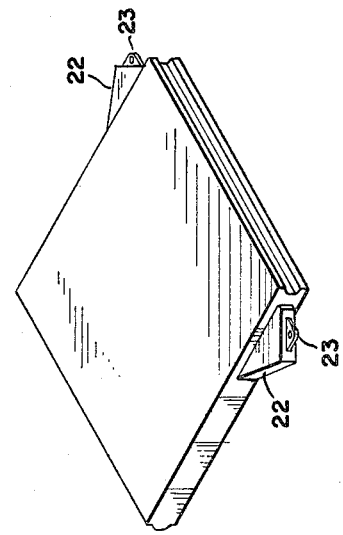
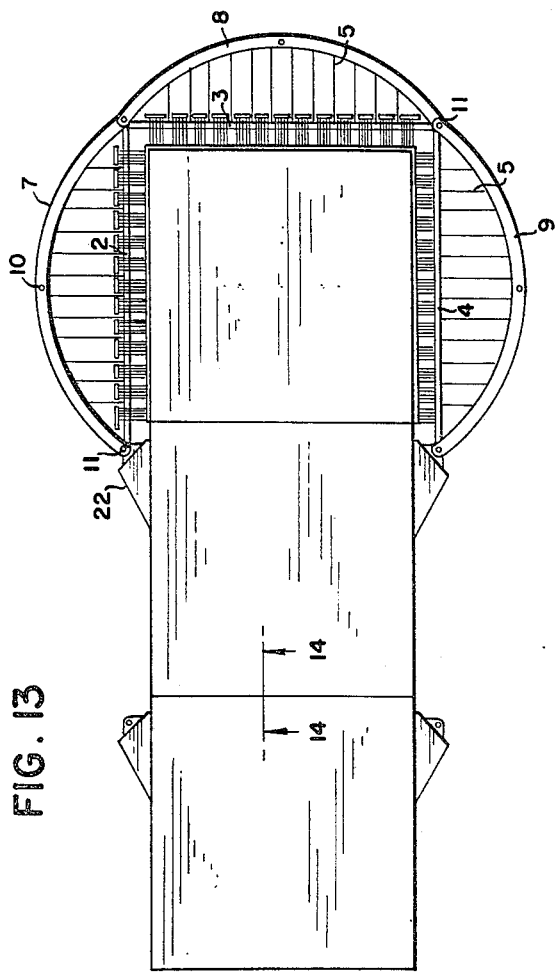
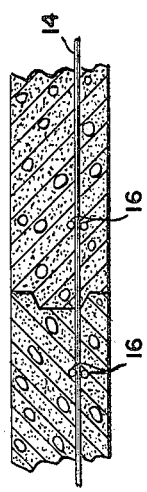
INVENTOR.
CLAUDE H. DARBY
BY
*Adams, Forward and McLean*
ATTORNEYS

United States Patent Office 3,069,138
Patented Dec. 18, 1962

3,069,138
TIED ARCH JACKING FRAME
Claude H. Darby, Springfield, N.J. (% O. J. Porter & Co., 415 Frelinghuysen Ave., Newark 12, N.J.)
Filed Sept. 8, 1961, Ser. No. 136,811
2 Claims. (Cl. 254—51)

This invention relates to a tied arch jacking frame for simultaneous pretensioning longitudinal and transverse reinforcing rods used in making reinforced, prestressed concrete slabs.

Prestressed pavement is becoming increasingly important in the construction of heavy duty automotive highways and aircraft runways for the larger jet propelled transports. Prestressed pavement permits low maintenance costs resulting from an elimination of cracks during the service life of the pavements. Prestressing also provides an increase in the tensile strength of concrete with simultaneous homogenuity and continuity imparted to the pavement. Elimination of contraction joints and wider spacing of expansion joints, together with a large increase in load carrying capacity are further advantages.

Prestressed pavement slabs of the size used in constructing automotive highways and aircraft runways require field fabrication and the main problem involved is in pretensioning the reinforcing rods prior to the pouring of the concrete. The present invention provides a means for simultaneous pretensioning longitudinal and transverse reinforcing rods or wire strand used in making prestressed reinforced concrete slabs in the form of a tied arch jacking frame. The frame comprises four coplanar tie beams positioned horizontally in the form of a rectangle, preferably a square, and pinioned at each corner, four arches positioned exteriorly of the rectangle formed by the tie beams and also pinioned at each corner and a plurality of hangers connecting each tie beam with its exteriorly positioned arch. Two adjacent tie beams are provided with means for connecting reinforcing rods thereto and the oppositely positioned two tie beams are provided with openings for passing reinforcing rods therethrough. Jacking beams are positioned exteriorly of the latter two tie beams and means are provided for connecting the reinforcing rods passing through the tie beams having openings therefor to the jacking beams, the jacking beams being sized to pass between two adjacent hangers.

The tied arch jacking frame of this invention is further shown in detail in the attached drawings wherein FIGURE 1 is a schematic plan view showing the tied arch jacking frame in place with reinforcing rods pretensioned and ready for concrete pouring;

FIGURE 4 is an enlarged fragmentary plan view showing details of jacking beam relationship with respect to oppositely positioned tie beams with jacking means in place and reinforcing rod connection to tie beams and jacking beams;

FIGURE 5 is a view of the upper portion of FIGURE 4 with the jacking means removed and spreader means in place between the jacking beam and the tie beam holding tension on the reinforcing rods;

FIGURE 6 is a side elevation taken along line 6—6 of FIGURE 4;

FIGURE 7 is a side elevation taken along line 7—7 of FIGURE 5;

FIGURE 8 is an enlarged plan view showing the connection of a hanger to an arch;

FIGURE 9 is a side elevation of the connection of FIGURE 8 taken along line 9—9;

FIGURE 10 is a side elevation taken along line 10—10 of FIGURE 1 showing the reinforcing rod positioning with respect to the concrete pouring form.

FIGURE 11 is an isometric view of the reinforcing rod positioning shown in FIGURE 10;

FIGURE 12 is an isometric view of a prestressed concrete slab modified to coact with a portion of the tied arch frame of this invention;

FIGURE 13 is a schematic plan view of two prestressed concrete slabs, one of which is coacting with a portion of the tied arch frame of this invention to pretension reinforcing rods, and with the concrete newly poured for the next slab; and FIGURE 14 is a fragmentary cross-sectional view taken along line 14—14 of FIGURE 13.

Figure 1:
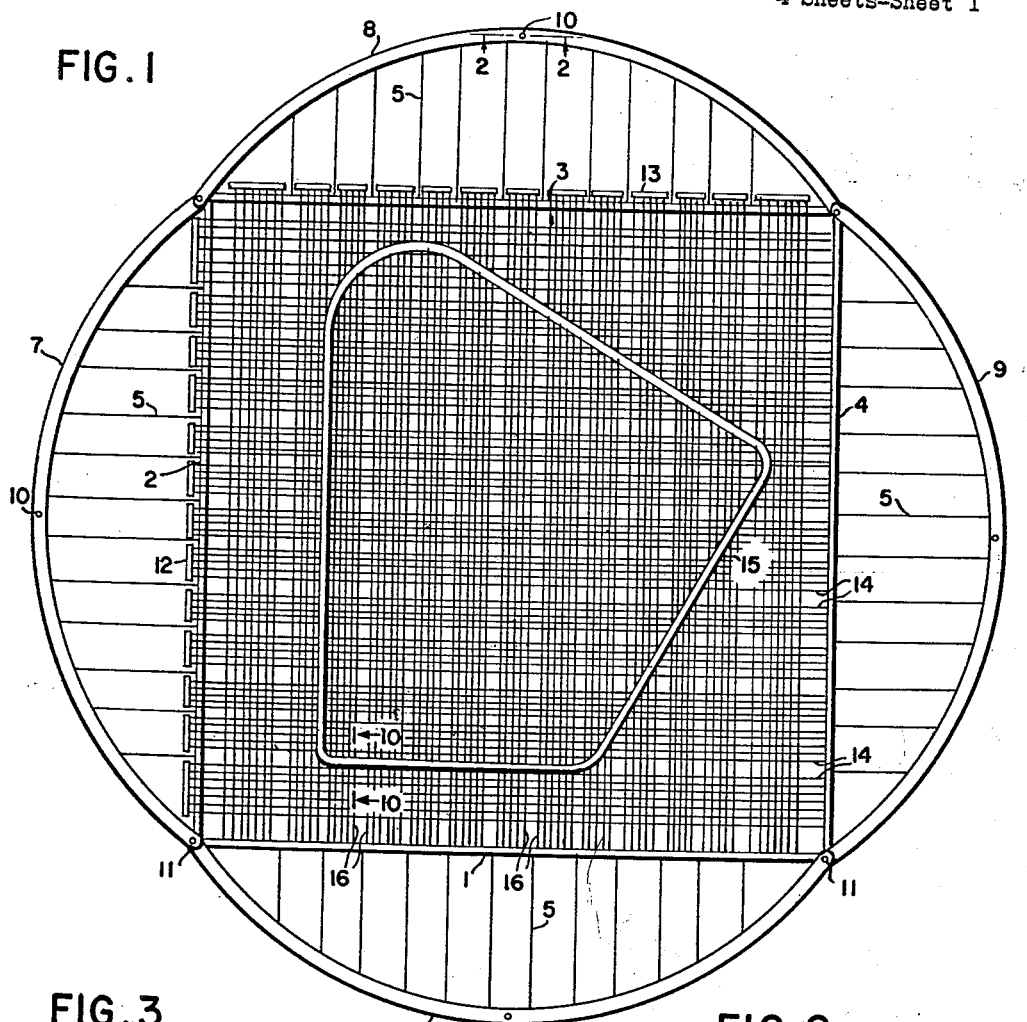
Figure 3:
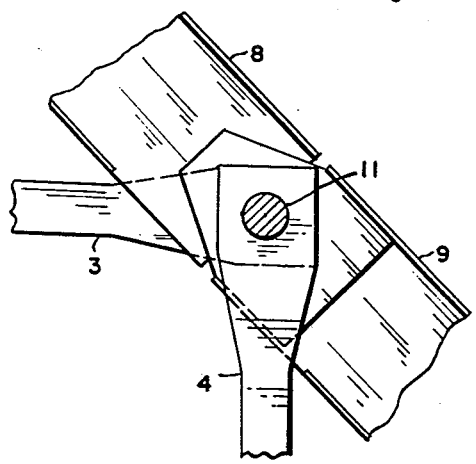
FIGURE 3 is an enlarged fragmentary plan view of the junction of the ties and arches showing pinioning details of the tie beams and arch components.
Figure 2:
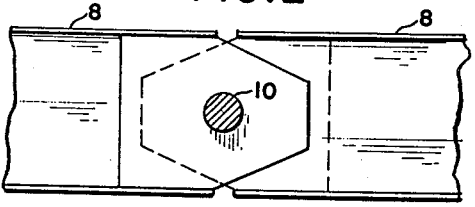
FIGURE 2 is an enlarged fragmentary section taken along line 2—2 of FIGURE 1 showing pinioning details of arch components.

Referring now to FIGURE 1, numerals 1, 2, 3 and 4 designate tie beams of equal length positioned in the form of a square and connected by hangers 5 respectively to exteriorly positioned arches 6, 7, 8 and 9. Arches 6, 7, 8 and 9 as shown are each in two sections pinioned together at the arch crown by pins 10, as shown in detail in FIGURE 2, but the arches can be a single member or can be composed of more than two sections suitably connected. Adjacent tie beams and arch sections are pinioned together by pins 11 as shown in FIGURE 3.

Positioned exteriorly of tie beams 2 and 3 are jacking beams 12 associated with tie beam 2 and jacking beams 13 associated with tie beam 3. Longitudinal reinforcing rods 14 are connected at one end to tie beam 4, pass through holes in concrete pouring form 15, pass through holes in tie beam 2, and are connected to jacking beams 12. Transverse reinforcing rods 16 are connected at one end to tie beam 1, pass through holes in concrete pouring form 15, pass through holes in tie beam 3, and are connected to jacking beams 13. These latter connections and relationships are shown in detail in FIGURE 4 with numeral 17 designating conventional reinforcing rod connectors for pretensioning the rods. FIGURE 4 further shows hydraulic jacks 18 in place extended to pretension reinforcing rods 16 and details of the connection of hangers 5 to tie beams 1 and 3 by means of plates 19 welded to hanger 5 and pinned to tie beams 1 and 3 by pins 20. FIGURE 5 is a view of the upper portion of FIGURE 4 with spreaders 21 in place and hydraulic jacks 18 removed, spreaders 21 holding tension on reinforcing rods 16.

Hangers 5 are connected to arches 6, 7, 8 and 9 by plates 24 welded to the arch rib, plates 25 welded to plates 24 and spreader plate 26 and bolts 27 as is shown in FIGURES 8 and 9. Advantageously, the hangers 5 are constructed of wide flange "I" beams so as to form a guide for jacking beams 12 and 13.

The tied arch jacking frame of my invention is employed in making prestressed concrete slabs in the following manner. The under surface of, for example, crushed rock is first prepared in the conventional manner. If the slab is to be laid over an existing concrete slab, a layer of, for example, sand is put down. Concrete pouring forms 15 are then assembled, tie beams 1, 2, 3 and 4 and arches 6, 7, 8 and 9 are placed together and pinioned with pins 10 and 11. Hangers 5 having plates 19 welded thereto are then connected to corresponding tie beams and arches by means of pins 20 and bolts 27. Jacking beams 12 and 13 are placed in position and longitudinal and transverse reinforcing rods 14 and 16 are connected at one end to tie beams 4 and 1 respectively, passed through the holes in pouring-form 15, passed through the holes in tie beams 2 and 3 respectively, and connected to jacking beams 12 and 13 respectively. Reinforcing rods 14 and 16 are positioned in pairs, as is conventional, and as is shown in FIGURE 11. Also, the holes in pouring form 15, in tie beams 2 and 3, and the connections to tie beams 1 and 4 and jacking beams 12 and 13 are below the horizontal center line so that any non-horizontal stress imposed by pretensioning rods 14 and 16 will be directed downwardly towards the ground. Pairs of jacks 18 are then placed between tie beams 2 and 3 and jacking beams 12 and 13 respectively and tension is applied to reinforcing rods 14 and 16. The tied arch jacking frame is designed for balanced reactions at all four pins 11 and these can be maintained by simultaneous jacking of all jacking beams 12 and 13 or by jacking of symmetrical pairs of jacking beams in each arch system. The selection of pairs of jacking beams for jacking is determined by stress analysis of the arch to keep the frame stresses at a minimum magnitude. After pretensioning has been applied by a given jacking beam, spreaders 21 can be emplaced and the jacks removed. Concrete is then poured in concrete pouring form 15 in the conventional manner.

FIGURE 1 shows concrete pouring form 15 with an irregular shape. The form can be of any shape including rectangular or square as is shown in FIGURE 11 and the prestressed slab will be of the shape shown in FIGURE 12 excluding triangular abutments 22. After the prestressed slab has hardened, tension is removed from reinforcing rods 14 and 16 and the tied arch jacking frame of this invention is disassembled.

If the prestressed slab is to be a portion of a highway or aircraft runway, then the tied arch jacking frame of my invention can be used in a unique manner to provide a continuous prestressed pavement. For example, triangular abutments 22, which can be made of reinforced concrete or steel, can be rigidly attached to the prestressed slabs by one of the conventional epoxy concrete bonding compositions. Abutments 22 have fastened thereto pin receiving means 23. The tied arch jacking frame can then be assembled using the slab having abutments 22 attached thereto as a replacement for one of the anchoring tie beams and corresponding arch, for example, tie beams 1 or 4 and arches 6 and 9 respectively. This is shown in FIGURE 13. Unless the slab is quite large, the arrangement shown in FIGURE 13 when under tension may pull the slab along the ground so that when constructing an aircraft runway overlay, for example, it is advantageous to work from the center outwardly toward the ends using two tied arch jacking frames affixed to each end of the initial center slab by means of two pairs of abutments 22. After the abutments 22 have served their purpose, they can be removed and the joint refinished. The keystone joint shown in FIGURE 14 can be augmented or replaced by a plain joint bonded by conventional epoxy bonding compositions.

If the abutments 22 would serve any useful purpose, however, as for supporting aircraft runway lights, or highway lights, the concrete pouring form 15 can be shaped to include abutments 22.

The tied arch jacking frame of this invention can be constructed in any desired size and is fabricated of steel, the individual members being sized to withstand the stresses to be encountered.

I claim:

1. A tied arch jacking frame for simultaneously pretensioning longitudinal and transverse reinforcing rods used in making prestressed reinforced concrete slabs which comprises four coplanar tie beams positioned in the form of a rectangle and pinioned at each corner, at least two adjacent tie beams having openings for passing reinforcing rods therethrough, four arches positioned exteriorly of the rectangle formed by the tie beams and also pinioned at each corner, hangers connecting each tie beam with its oppositely positioned arch, means for connecting reinforcing rods to the other two adjacent tie beams, jacking means positioned exteriorly of the first mentioned two adjacent tie beams and means for connecting reinforcing rods passing through the tie beams to the jacking means.

2. A tied arch jacking frame for simultaneously pretensioning longitudinal and transverse reinforcing rods used in making prestressed reinforced concrete slabs which comprises four tie beams of equal length positioned in the form of a square and pinioned at each corner, at least two adjacent tie beams having openings for passing reinforcing rods therethrough, four arches positioned exteriorly of the square formed by the tie beams and also pinioned at each corner, hangers connecting each tie beam with its oppositely positioned arch, means for connecting reinforcing rods to the other two adjacent tie beams, jacking beams positioned exteriorly of the first mentioned two adjacent tie beams and means for connecting reinforcing rods passing through the tie beams to the jacking beams.

References Cited in the file of this patent

UNITED STATES PATENTS

| | | |
|---|---|---|
| 1,630,839 | Fisher et al. | May 31, 1927 |
| 3,023,475 | Yerby et al. | Mar. 6, 1962 |